Patented Aug. 24, 1948

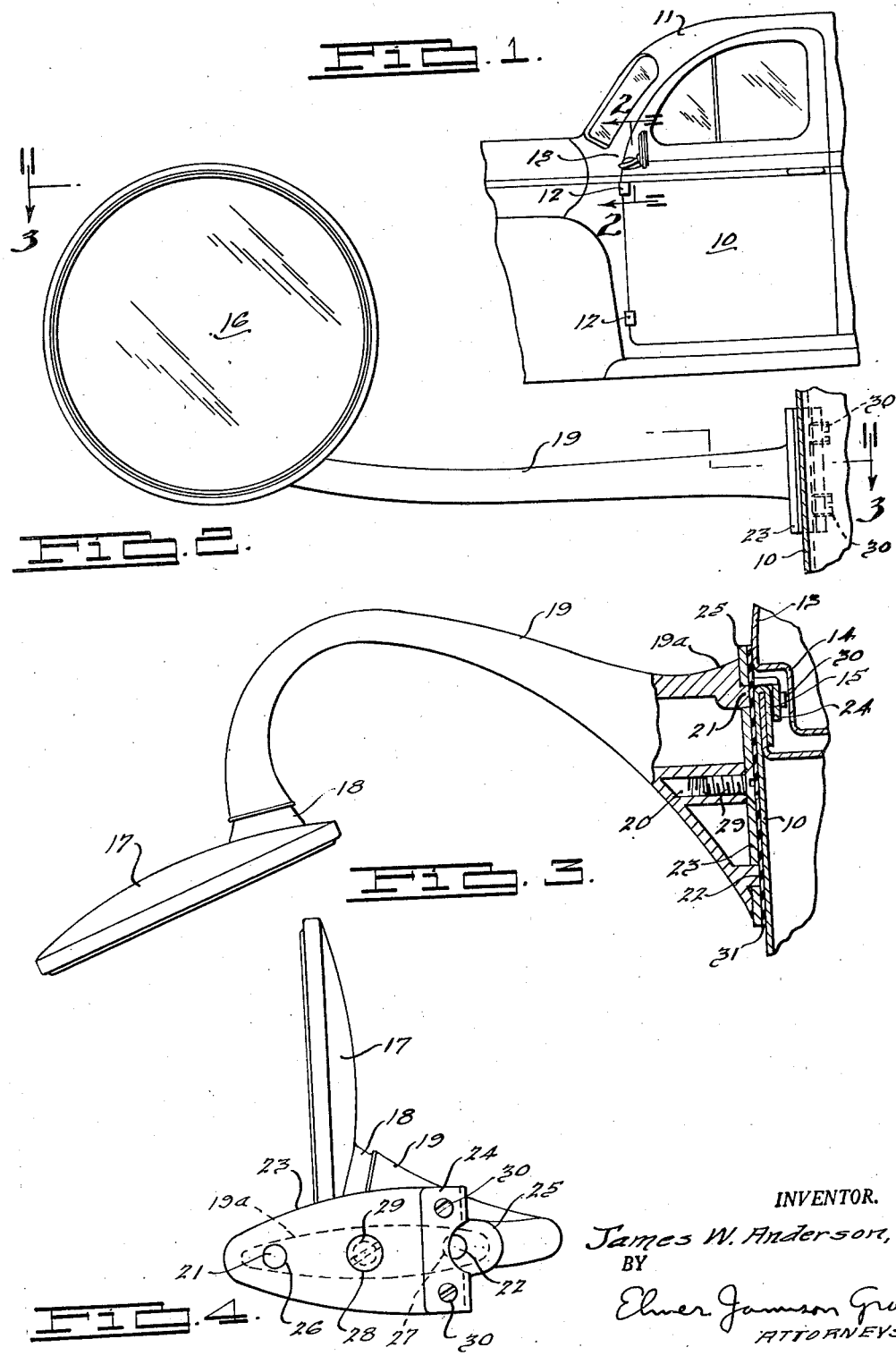

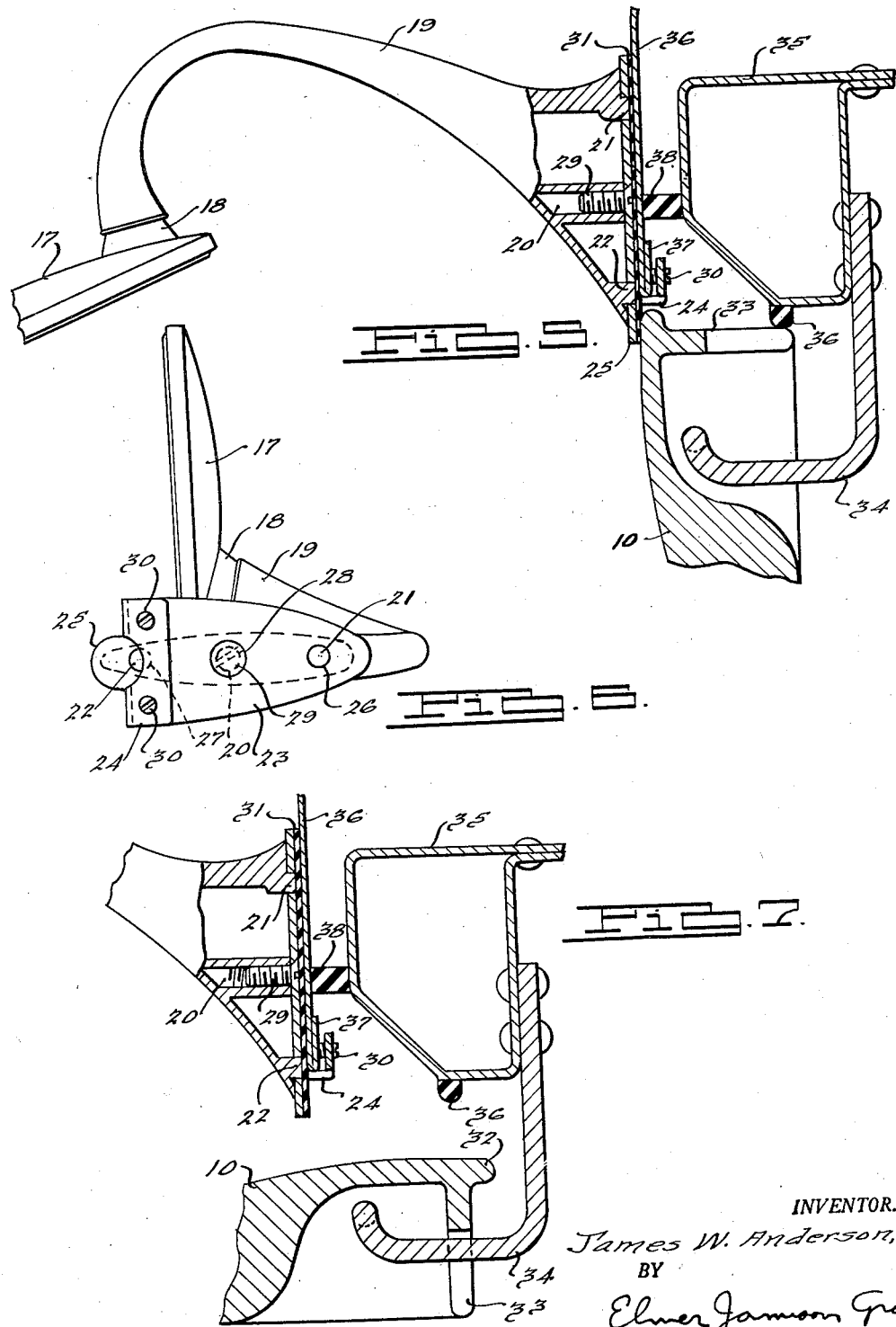

2,447,786

UNITED STATES PATENT OFFICE 2,447,786

REARVIEW MIRROR

James W. Anderson, Jr., Detroit, Mich., assignor to Monarch Governor Company, Detroit, Mich., a corporation of Michigan Application January 26, 1946, Serial No. 643,684

4 Claims. (Cl. 248—226)

This invention relates to an improved outside mirror assembly particularly useful on automobiles or other motor vehicles. The invention is especially applicable to an outside mirror assembly attachable to the front upright flanged edge of a door or to the upright flanged edge of a vehicle hood, cowl or body adjacent the front of the door.

It is an object of the invention to provide an improved rear vision mirror having a base element attachable to the front upright flanged edge of a vehicle door and having an integrally formed member which rests tightly against the surface of the hood, cowl or body of the vehicle adjacent the front edge of the door when the door is in a closed position, thus ensuring a more rigid and dependable support for the mirror assembly when it is mounted on the door.

Another object of the invention is to provide an outside mirror assembly having a base or clamping plate attachable to the upright flanged edge of a vehicle hood, cowl or body adjacent the front edge of the vehicle door and having an integrally formed projecting tongue or lip which is adapted to rest tightly against the outer surface of the door panel when the door is in closed position. This construction lends itself to the type of vehicle body construction having a door and a door pillar provided with a concealed type of hinge and a front door edge which swings inwardly into a recess between the hinge and door pillar when the door is open.

A further object of the invention is to provide an improved rear view mirror of economical and useful construction and which by a simple rearrangement of parts or reversal of its base or clamping member may easily be installed either on the front upright flanged edge of a vehicle door or to the upright flanged edge of a vehicle hood, cowl or body adjacent the front edge of the door.

Other objects of this invention will appear in the following description and appended claims, reference being had to the accompanying drawings forming a part of this specification wherein like reference characters designate corresponding parts in the several views.

Fig. 1 is a fragmentary side elevation of an automobile body equipped with an outside rear view mirror constructed in accordance with the present invention.

Fig. 2 is a section taken substantially through lines 2—2 of Fig. 1 looking in the direction of the arrows.

Fig. 3 is a section taken substantially through lines 3—3 of Fig. 2 looking in the direction of the arrows.

Fig. 4 is an enlarged side elevation view of the mirror assembly as shown in Fig. 1.

Fig. 5 is an enlarged sectional view of the mirror assembly shown in Fig. 3 but mounted on the hood or cowl portion of a vehicle.

Fig. 6 is a view similar to Fig. 4 with the base or clamp member reversed.

Fig. 7 is a view similar to Fig. 5 illustrating the door of the vehicle body in open position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings I have illustrated, by way of example, certain embodiments of the present invention. The outside rear view mirror illustrated in Figs. 1 through 4 is adapted to be mounted on the flange edge of the front door 10 of an automobile body 11, the door being hinged in the usual manner at 12 to a pillar or post 13 of the body. This pillar is rabbeted or recessed at 14 to receive the overlap flange 15 of the door and which extends along the front upright edge thereof.

The mirror assembly comprises a silvered glass or equivalent reflector 16 which is encased within and retained by a metallic backing or shell 17. The shell 17 is fixed to the outer end of a supporting arm 19 by pivotal means, such as a ball and socket joint, so that the position of the reflecting surface is rendered adjustable. The arm 19 terminates at its inner end in an elongated suitably contoured base 19a which is provided with a centrally positioned blind threaded aperture or tapped hole 20. Also at its inner end the arm 19 is provided with a pair of integrally formed projecting dowels or keying lugs 21 and 22 which are spaced equidistant from and in alignment with the aperture 20.

The mirror assembly also comprises a base or clamping plate 23 which is attachable to the base 19a of the mirror supporting arm 19. The clamping plate 23 acts as a bearing member interposed between the mirror supporting arm and the door panel and body of an automobile. The clamping plate 23 may be of any desired size or design although preferably having a surface of greater area than the surface of the inner end of the supporting arm 19.

The end of the plate 23 is formed with a return bent flange 24 spaced from the back of the plate to provide a clamp adapted to be slid over the door overlap flange 15 as shown in Fig. 3. The clamp is provided with tapped holes to receive set screws 30 by which it may be readily secured in position. The metal of the plate 23 at the locality of the bend is punched or lanced out centrally to form a projecting tongue 25 extending in the plane of the plate beyond the clamp. The plate 23 is further provided with a pair of holes 26 and 27 which are spaced equidistant from a countersunk hole 28 which is centrally located in the plate 23. Since the distance between the holes 26 and 27 is equal to the distance between the keying lugs 21 and 22 on the base 19a it will be apparent that when the countersunk hole 28 is registered with the tapped hole 20 the lugs 21 and 22 will register with holes 26 and 27 when the plate 23 is positioned as shown in Figs. 3 and 4 or reversed as later described in connection with Figs. 6 and 7.

In attaching the plate 23 to the inner end of the arm 19 the keying lugs 21 and 22 respectively are inserted through the holes 26 and 27 respectively of the plate 23. The hole 28 of the plate 23 being in register with threaded aperture 20 of the supporting arm 19 is adapted to receive a screw 29 to securely hold the plate against the base 19a of the supporting arm 19. After mounting the assembly on the door the set screws 30 may be tightened against the inner surface of the door overlap flange 15 in order to draw the clamping plate tightly against the door 10, a gasket 31 being interposed between the clamping plate and the outer surfaces of the door 10. The end of the base 19a rests against the tongue 25 at one side and when the door is in closed position the tongue 25 overlaps the cowl panel 13 at its opposite side.

In Figs. 5 to 7 inclusive I have illustrated the manner in which the present mirror assembly, by rearrangement of the clamping plate on the base of the mirror arm or bracket, may be used in connection with an automobile body having a door hinged in such manner as to cause the front edge thereof to swing inwardly. With a construction of this type it is not possible to mount the mirror on the edge of the door. However, the present improved mirror assembly is so constructed as to permit it to be mounted on the edge of the cowl or hood by merely reversing the position of the clamp without requiring any change or modification in the construction.

Referring to Figs. 5 and 7, a door 10 is provided having an upright door flange 32 and a front jamb edge 33. The door 10 is hinged in a conventional manner by a concealed type of hinge arm 34 to a door pillar 35. When the door is in closed position the front edge 33 of the door rests against a rubber insulation molding 36 interposed between the door pillar 35 and the inner edge of the door 33. As shown in Fig. 7 it will be seen that when the door is in open position the flange 32 is swung inwardly into a recess provided between the door pillar and the hinge arm. The hood 36 of the body terminates in an upright return bent flange 37 which lies in juxtaposition to the door flange 32 when the door is in closed position. When the hood 36 is secured in position it rests against a rubber insulation molding 38 interposed between the door pillar 35 and the hood.

In the assembly of the mirror as shown in Fig. 6 the screw 29 may be loosened in the threaded aperture 20 and the hole 28 sufficiently to permit the withdrawal of the plate 24 from the keying lugs 21 and 22. The plate 24 may then be rotated 180° on the screw 29 until the aperture 27 is in alignment with the lug 22 and the aperture 28 in alignment with the lug 21. By then tightening the screw 29 the plate 24 is held securely against the base 19a of the supporting arm 19.

In mounting the mirror as shown in Fig. 7 upon the automobile body the flange 24 of the plate 23 embraces the upright flange 37 of the hood 36. The set screws 30 may be tightened against the inner surface of the flange 37 in order to draw the clamping plate 23 and attached mirror tightly against the outer surfaces of the hood 36 and the door 10, a gasket 31 being interposed between the clamping plate and the outer surfaces of the hood and door. The end of the base 19a rests against the tongue 25 at one side and when the door is in closed position the tongue 25 overlaps the outer surface of the door 10 at its opposite side.

Thus it will be seen that I have provided an improved rear view mirror of economical and useful construction which by a simple reversal of parts may be conveniently installed either on the front upright edge of the automobile door or on the upright edge of the hood or cowl. In the arrangement as shown in Fig. 3 the tongue 25 rests against the cowl or body and assists in supporting the mirror arm against vibration, cocking or sagging. In the arrangement shown in Fig. 5 the tongue 25 gives the same bracing effect against the outer surface of the door. In either installation the clamping plate provides adequate bearing surface against both the door and body panels to ensure a sturdy and dependable rear view mirror.

I claim:

1. A mirror assembly for a vehicle body having a body panel and a door panel terminating in juxtaposed upright edges, a mirror supporting arm, a clamping member secured to the inner end of the arm and having a clamping portion adapted to embrace one of said edges, said member having a tongue projecting beyond the clamping portion in substantially the plane of the member and adapted to overlie and engage the other of said edges when the door is closed.

2. A mirror assembly for a vehicle body having a body panel and a door panel terminating in juxtaposed upright edges, a mirror supporting arm, a clamping member having a clamping portion adapted to embrace the edge of the door or body panel, and means for detachably securing said member to the inner end of the arm in either of two positions determined by turning the member through an angle of 180°, said means comprising elements for securing and keying the member to the arm.

3. A mirror assembly for a vehicle body having a body panel and a door panel terminating in juxtaposed upright edges, a mirror supporting arm, a clamping member having a clamping portion adapted to embrace the edge of the door or body panel, and means for detachably securing said member to the inner end of the arm in either of two positions determined by turning the member through an angle of 180°, said means comprising a pair of keying projections on the arm extending into holes in said member and an attaching element located centrally therebetween.

4. A mirror assembly for a vehicle body having a body member and a door provided with juxtaposed upright edges, a mirror supporting arm, a clamping member attached to the inner end of the arm and having a clamping portion adapted to embrace the edge of the door, said clamping member having a tongue projecting beyond the clamping portion in substantially the plane of the member and adapted to overlie and engage the edge of the body member adjacent the edge of the door when the door is closed, and means for detachably securing the clamping member to the inner end of the arm, said means comprising a pair of keying projections on the arm extending into holes in said member and an attaching element located centrally therebetween.

JAMES W. ANDERSON, JR.

REFERENCES CITED

The following references are of record in the file of this patent:

UNITED STATES PATENTS

| Number | Name | Date |
|---|---|---|
| 2,192,521 | McGaw | Mar. 5, 1940 |
| 2,338,780 | Poncher et al. | Jan. 11, 1944 |
| 2,419,306 | Zeiler | Apr. 22, 1947 |